(No Model.)

G. HANCOCK.
ELASTIC TIRE FOR VEHICLE WHEELS.

No. 511,733. Patented Dec. 26, 1893.

Witnesses.
Charles Hannigan.
James W. Brunson.

Inventor.
George Hancock
by S. Scholfield
Atty.

THE NATIONAL LITHOGRAPHING COMPANY,
WASHINGTON, D. C.

UNITED STATES PATENT OFFICE.

GEORGE HANCOCK, OF PROVIDENCE, RHODE ISLAND.

ELASTIC TIRE FOR VEHICLE-WHEELS.

SPECIFICATION forming part of Letters Patent No. 511,733, dated December 26, 1893.

Application filed October 20, 1892. Serial No. 449,472. (No model.)

*To all whom it may concern:*

Be it known that I, GEORGE HANCOCK, a citizen of the United States, residing at Providence, in the State of Rhode Island, have invented a new and useful Improvement in Elastic Tires for the Wheels of Vehicles, of which the following is a specification.

The object of my invention is to provide an efficient and durable elastic tire, which may be employed, either as a pneumatic or a cushion tire, and it consists in the combination with an elastic inner rubber tube, of an outer rubber covering and an intervening filling of cork, as hereinafter fully set forth.

Figure 1:
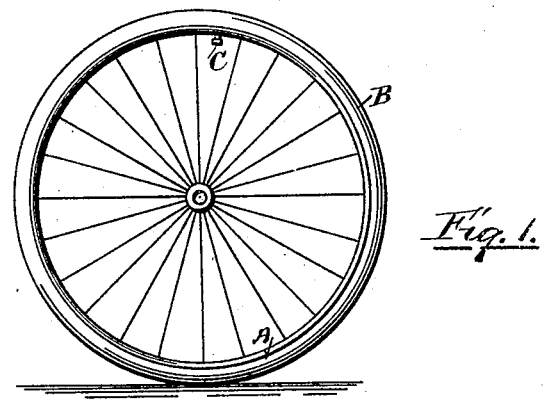
Figure 4:
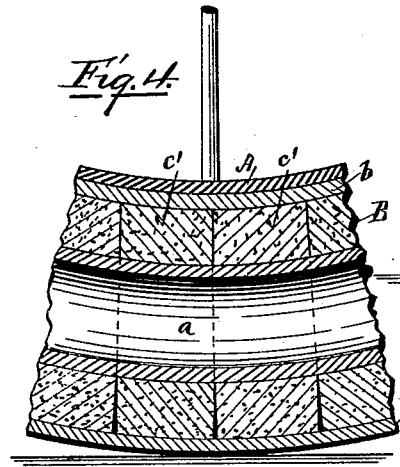
Figure 2:
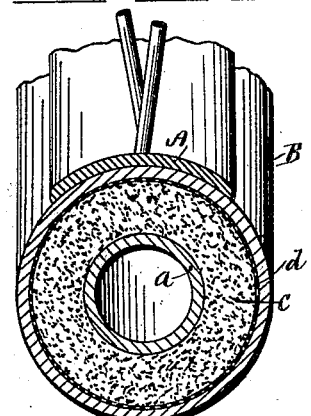
Figure 3:
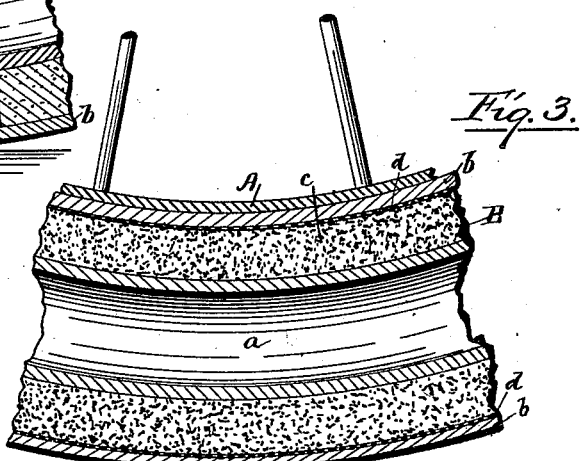

Figure 1, represents a side elevation of the vehicle wheel provided with an elastic tire. Fig. 2, represents an enlarged transverse section, taken through the rim of the wheel and the tire. Fig. 3, represents an enlarged detail longitudinal section. Fig. 4, represents an enlarged detail longitudinal section showing a modification.

In the accompanying drawings, A represents the rim of the wheel, and B the elastic tire, which when used as a pneumatic tire will be provided with a closing valve or cap C, for holding the air under pressure.

The tire B is formed with a central elastic rubber tube $a$, and with the outer rubber covering $b$, and between the covering $b$ and the tube $a$, is a filling of cork $c$, the said filling being either in the granular form shown in Figs. 2 and 3, or of centrally perforated whole corks $c'$, as shown in Fig. 4, and in this latter case, the outer covering $b$ may be cemented or vulcanized directly upon the outer surface of the corks, without the interposition of a textile envelope, but in the case of the granulated cork filling $c$, I prefer to apply to the said filling a textile envelope $d$, upon which is placed the rubber covering $b$.

The parts of the tire are cemented together or vulcanized in complete annular form, and in the employment of granulated cork $c'$, I prefer to incorporate therewith a quantity of rubber sufficient to connect the particles of cork to each other. I also prefer to treat the perforated whole corks $c'$ with a thin coating of rubber.

I claim as my invention—

1. In an elastic tire for vehicles, the combination with the elastic inner rubber tube, and the outer rubber covering of an intervening filling of cork.

2. In an elastic tire for vehicles, the combination with the elastic inner rubber tube and the outer rubber covering, of the intervening filling of cork, and the textile envelope, substantially as described.

GEORGE HANCOCK.

Witnesses:
SOCRATES SCHOLFIELD,
JAMES W. BEAMAN.